(12) United States Patent
Cariou et al.

(10) Patent No.: US 10,917,770 B2
(45) Date of Patent: Feb. 9, 2021

(54) ENHANCED NEGOTIATION PROTOCOL FOR TRIGGERED PEER TO PEER COMMUNICATIONS

(71) Applicant: Intel Corporation, Santa Clara, CA (US)

(72) Inventors: Laurent Cariou, Portland, OR (US); Yaron Alpert, Hod Hasharon (IL); Ehud Reshef, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/446,297

(22) Filed: Jun. 19, 2019

(65) Prior Publication Data
US 2019/0306685 A1 Oct. 3, 2019

Related U.S. Application Data

(60) Provisional application No. 62/687,129, filed on Jun. 19, 2018.

(51) Int. Cl.
| | | |
|---|---|---|
| *H04W 4/70* | (2018.01) | |
| *H04W 8/24* | (2009.01) | |
| *H04W 76/14* | (2018.01) | |
| *H04W 28/02* | (2009.01) | |
| *H04W 4/80* | (2018.01) | |
| *H04W 72/04* | (2009.01) | |
| *H04W 84/12* | (2009.01) | |

(52) U.S. Cl.
CPC .............. *H04W 4/70* (2018.02); *H04W 4/80* (2018.02); *H04W 8/24* (2013.01); *H04W 28/0268* (2013.01); *H04W 28/0278* (2013.01); *H04W 72/0446* (2013.01); *H04W 76/14* (2018.02); *H04W 84/12* (2013.01)

(58) Field of Classification Search
CPC . H04W 48/14; H04W 72/0413; H04W 8/005; H04W 84/12; H04W 74/0816; H04W 74/004; H04W 74/006; H04W 74/0833; Y02D 70/00; Y02D 70/1222; Y02D 70/1264; Y02D 70/1224; Y02D 70/142; Y02D 70/21; Y02D 70/146; Y02D 70/1262; Y02D 70/22
See application file for complete search history.

(56) References Cited

U.S. PATENT DOCUMENTS

| | | | | |
|---|---|---|---|---|
| 2015/0201443 A1* | 7/2015 | Emani | ............... | H04B 10/1143 370/338 |
| 2015/0245393 A1* | 8/2015 | Lee | .................... | H04L 67/1046 370/338 |

(Continued)

*Primary Examiner* — Jung Liu
(74) *Attorney, Agent, or Firm* — Eversheds Sutherland (US) LLP

(57) ABSTRACT

This disclosure generally relates to methods, systems, and devices for enhanced negotiation protocol for triggered peer to peer (P2P) communications. A device may send a downlink frame including a first indication of a triggered direct peer-to-peer capability. The device may identify an uplink frame received from a station device. The device may determine that the uplink frame includes a second indication of the triggered direct peer-to-peer capability. The device may send a trigger frame during a transmission opportunity associated with the device, the trigger frame including a third indication of the triggered direct peer-to-peer capability.

20 Claims, 12 Drawing Sheets

(56) References Cited

U.S. PATENT DOCUMENTS

2016/0066353 A1\* 3/2016 Kumar ............... H04W 12/06
709/227
2016/0337838 A1\* 11/2016 Lee ................. H04W 48/14
2017/0085638 A1\* 3/2017 Lee ................. H04W 8/005
2019/0223220 A1\* 7/2019 Choi ............... H04W 74/0816

\* cited by examiner

ENHANCED NEGOTIATION PROTOCOL FOR TRIGGERED PEER TO PEER COMMUNICATIONS

CROSS-REFERENCE TO RELATED APPLICATION(S)

This application claims the benefit of U.S. Provisional Application No. 62/687,129, filed Jun. 19, 2018, the disclosure of which is incorporated herein by reference as if set forth in full.

TECHNICAL FIELD

This disclosure generally relates to systems and methods for wireless communications and, more particularly, to enhanced negotiation protocol for triggered peer to peer (P2P) communications.

BACKGROUND

Wireless devices are becoming widely prevalent and are increasingly requesting access to wireless channels. Wireless devices may coordinate transmissions to improve system throughput.

DETAILED DESCRIPTION

Figure 1:
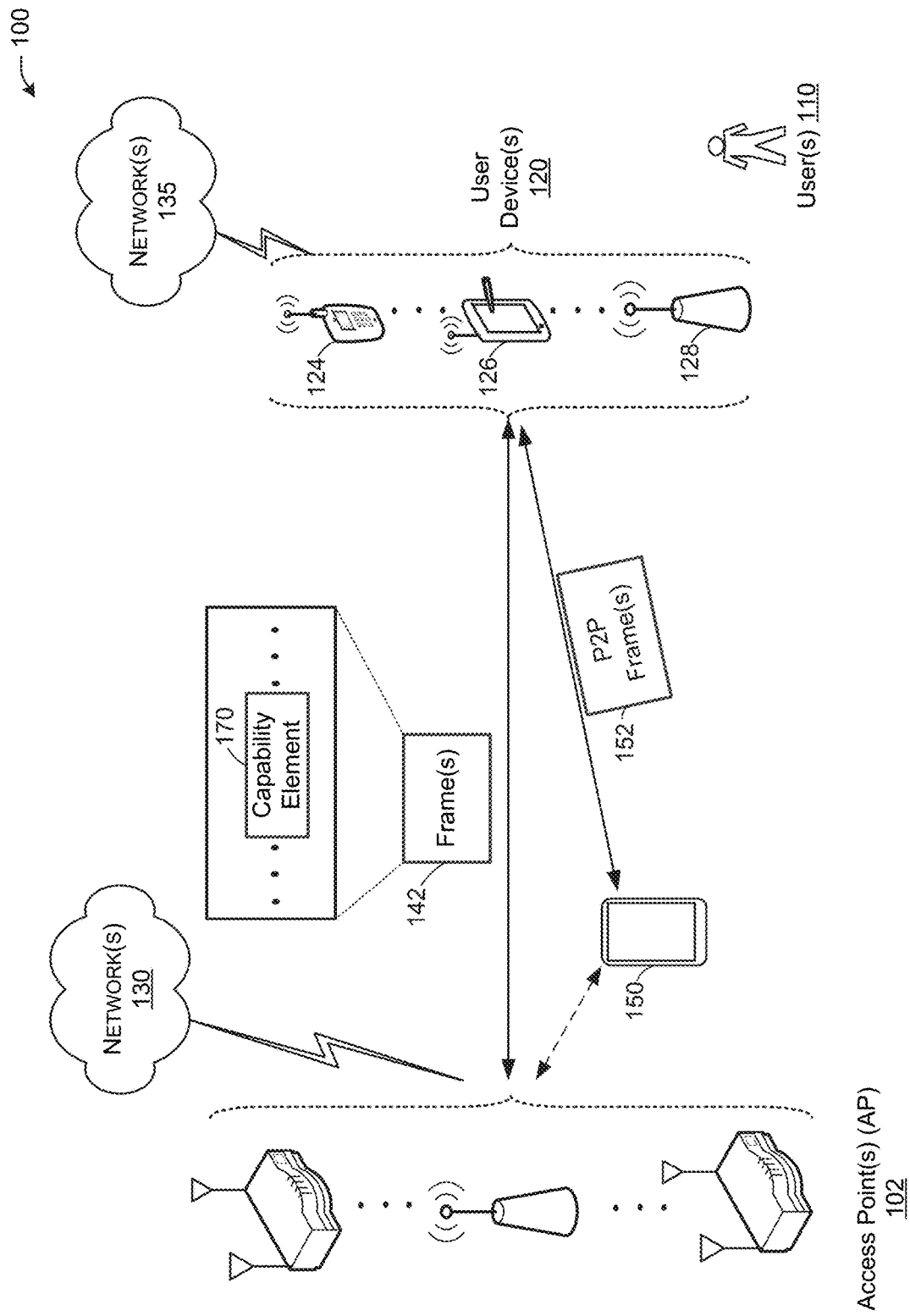
FIG. 1 is a network diagram illustrating an example network environment, in accordance with one or more example embodiments of the present disclosure.

Example embodiments described herein provide certain systems, methods, and devices for enhanced trigger frame types in wireless communication. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.11ax wireless communication standard allows multiple station devices (STAs) associated with an access point (AP) to send uplink (UL) transmissions (e.g., transmissions from a STA to an AP) simultaneously in a basic service set (BSS). In particular, an AP may trigger the UL transmissions from any combination of associated STAs by sending a trigger frame, which may identify the STAs that the AP is soliciting to send UL transmissions. A trigger frame may provide information to the STAs regarding time synchronization and/or frequency synchronization so that simultaneous UL transmissions do not interfere with each other. As a result, an orthogonal frequency-division multiple access (OFDMA) or multiple user (MU) multiple input, multiple output (MU-MIMO) UL transmission can be performed based on the trigger frame to increase system throughput. The trigger frame may allow the UL traffic to be scheduled by the wireless AP managing channel access in place of the STAs. The scheduling may help reduce channel contention on the air, and may reduce associated collisions. For example, rather than STAs competing for channel access, the AP may facilitate communications among multiple STAs.

STAs may support peer-to-peer (P2P) connections and traffic with other STAs, even when one or more STAs in a P2P connection may be associated with an AP. The IEEE 802.11ax standard supports P2P traffic between STAs (e.g., Tunneled Direct Link Setup (TDLS), P2P/Wi-Fi Direct) in which one of the STA may initiate transmission to another STA directly (e.g., not via the AP). However, STAs seeking to transmit P2P traffic with another STA may need to contend for channel access. In particular, the IEEE 802.11ax standard supports enhanced distributed channel access (EDCA). EDCA allows for prioritizing different types of traffic (e.g., voice, video etc.), and allows an AP to schedule transmissions.

For an AP to send a trigger frame and/or other types of frames, the AP may have to contend for a channel with STAs. When STAs are contending for a channel to send UL traffic and/or P2P traffic, an AP may have to contend with the STAs for the channel to gain access to the channel. OFDMA may reduce channel contention for UL transmissions, but STAs with P2P traffic may use EDCA to compete for a channel, so the AP may compete with P2P STAs for channel access, and P2P STAs may have to wait to send P2P traffic during an AP's transmission opportunity (TXOP).

Therefore, an enhanced triggered direct negotiation between APs and STAs may reduce channel contention for P2P communications.

Example embodiments of the present disclosure relate to systems, methods, and devices for capability exchange, negotiation and protocol to set up triggered direct P2P operations.

In one or more embodiments, APs may dedicate a portion of their TXOPs to STAs to allow for P2P communication between the STAs. When an AP gains channel access (e.g., through a channel contention process), the AP may have an amount of time, referred to as a TXOP, during which send frames. STAs may have TXOPs of their own when they gain channel access. Rather than triggering UL frames from STAs to the AP with a trigger frame, for example, the AP may trigger P2P communications between P2P-connected STAs (e.g., communications not through the AP) during the AP's TXOP. To facilitate this type of communication, referred to as triggered direct communications, the AP may need to be aware that STAs have P2P traffic, and the APs and STAs may need to coordinate so that the STAs are aware that the AP may trigger the P2P communications during the AP's TXOP.

In one or more embodiments, the AP may perform triggered direct communications to facilitate P2P communications with STAs. One or both STAs in a P2P relationship may be associated with the same AP. When both STAs are associated with the same AP, the STAs may coordinate (e.g., through an exchange of frames) to determine which STA will negotiation with the AP for triggered direct communications (e.g., which STA will be associated with a triggered direct P2P capability). When only one of two STAs in a P2P relationship is associated with an AP (e.g., the other STA is unassociated with any APs or is associated with a different AP), the STA associated with the AP having a triggered direct P2P capability may negotiation with the AP on behalf of the unassociated STA.

In one or more embodiments, the triggered direct negotiation between devices may include using bits of existing IEEE 802.11ax frames to indicate the triggered direct P2P capability and associated parameters, or may use new triggered direct frames. For example, the devices may use a capability bit, such as in a high efficiency (HE) capability element, or the devices may exchange new triggered direct request and response frames to indicate a triggered direct P2P capability and relevant parameters.

In one or more embodiments, either an AP or a STA may request a triggered direct P2P exchange. When a STA has P2P traffic to send, the STA may request that the AP facilitate the triggered direct P2P exchange. The AP may request the triggered direct P2P exchange, either because the AP has sensed P2P traffic among STAs in a channel, because the STA has provided an indication of a triggered direct P2P capability, or because the AP requests that the STA provide an indication of whether the STA has the triggered direct P2P capability (e.g., so that the AP may leave a portion of a TXOP to an associated STA for P2P communications when the AP does not require the entire TXOP).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120, a user device 150, and one or more access point(s) (AP) 102, which may communicate in accordance with IEEE 802.11 communication standards, such as the IEEE 802.11ax and/or IEEE 802.11az specifications. The user device(s) 120 and the user device 150 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 5:
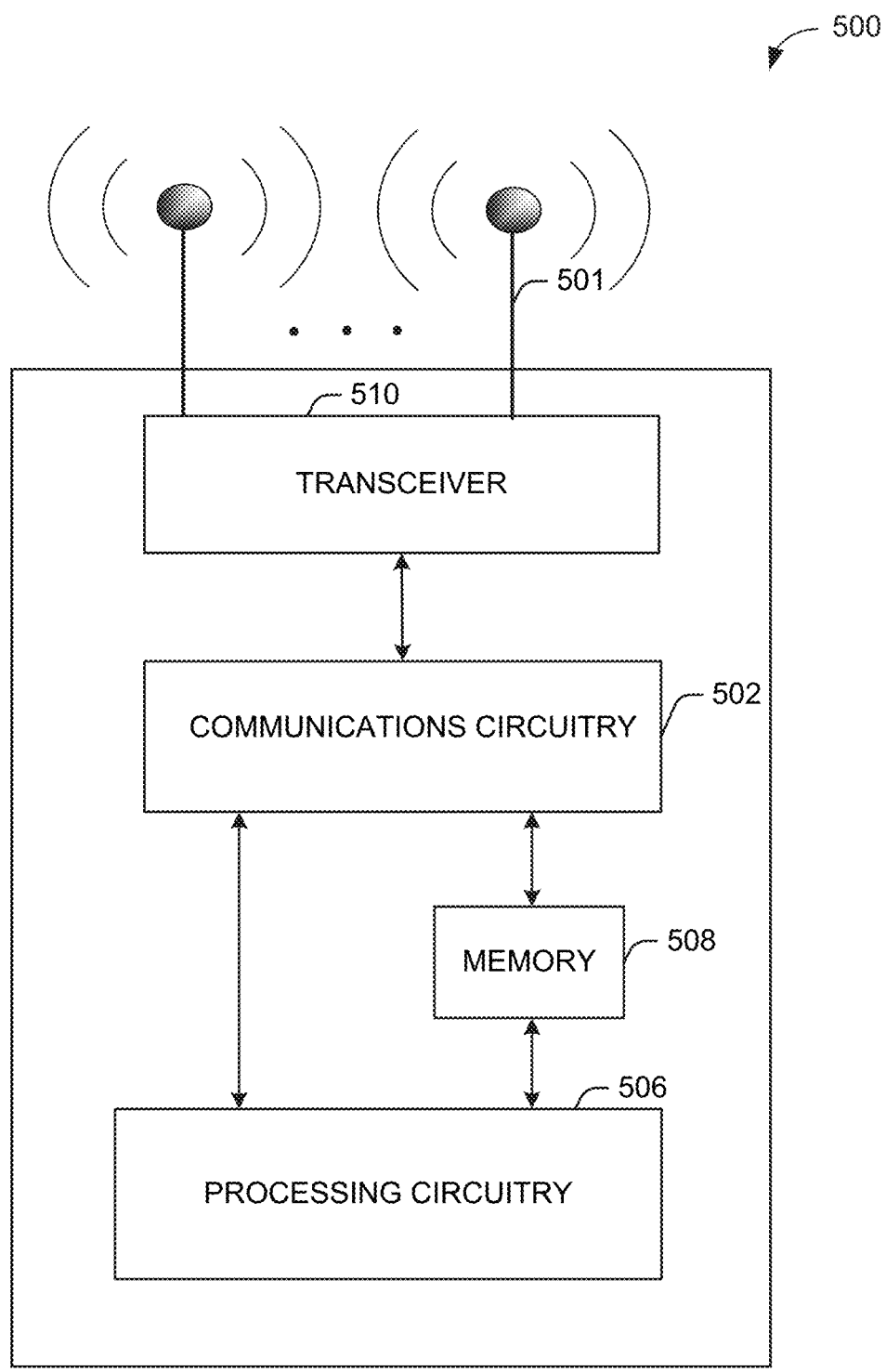
FIG. 5 depicts a functional diagram of an example communication station that may be suitable for use as a user device, in accordance with one or more example embodiments of the disclosure.
Figure 6:
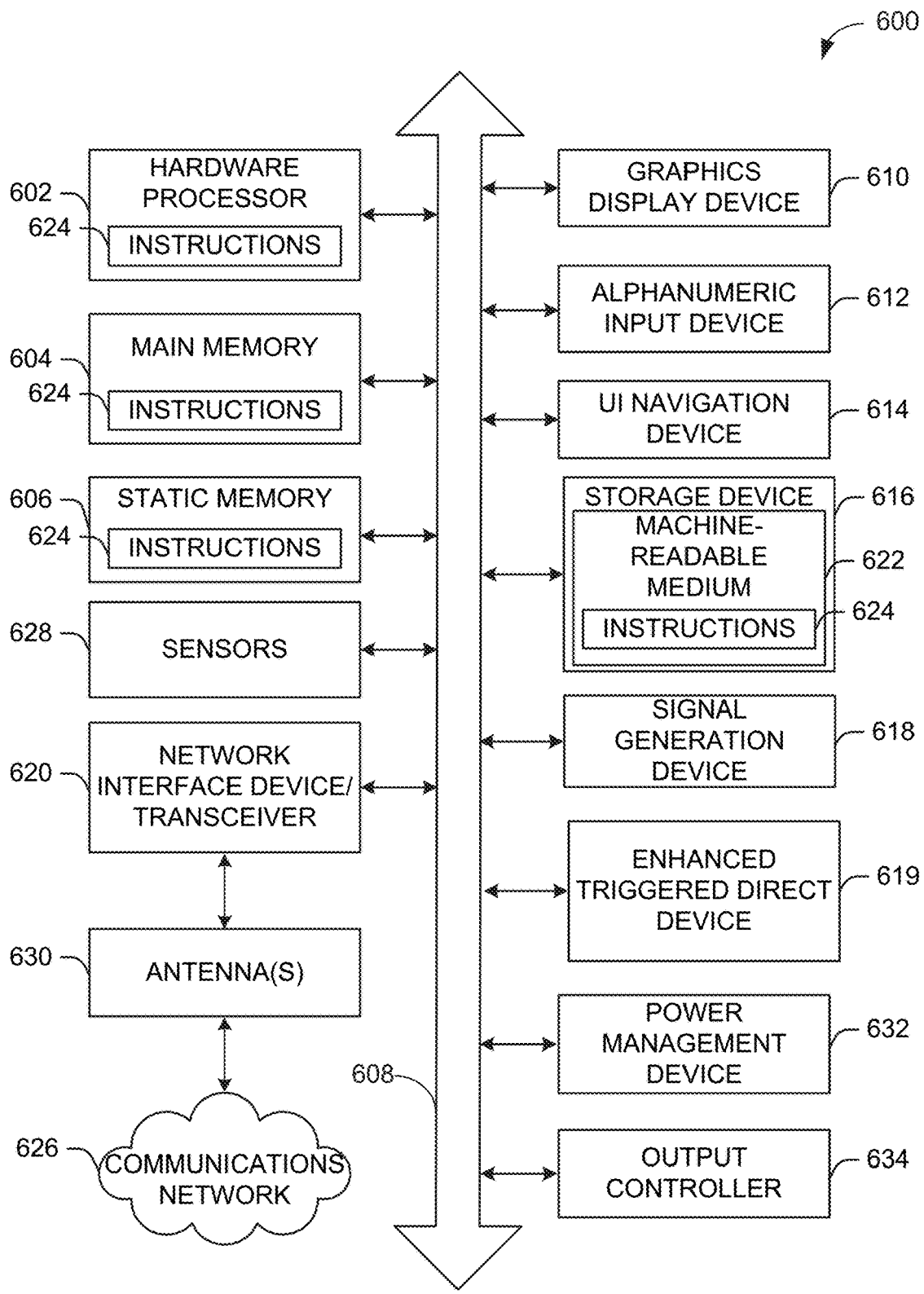
FIG. 6 depicts a block diagram of an example machine upon which any of one or more techniques (e.g., methods) may be performed, in accordance with one or more embodiments of the disclosure.

In some embodiments, the user devices 120 and AP 102 may include one or more computer systems similar to that of the functional diagram of FIG. 5 and/or the example machine/system of FIG. 6.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some demonstrative embodiments, the user device(s) 120 and/or the AP 102 may be configured to operate in accordance with one or more specifications, including one or more IEEE 802.11 specifications, (e.g., an IEEE 802.11ax specification, and/or any other specification and/or protocol).

In some demonstrative embodiments, the one or more APs 102 and the one or more user devices 120 may exchange one or more frames 142. The one or more frames may include probe requests and responses, association requests and responses, management frames, DL frames, UL frames, data frames (e.g., PPDUs), trigger frames, beacon frames, triggered direct request and response frames, and the like. For example, the one or more user devices 120 may be associated with the one or more APs 102 in one or more BSSs. The user device 150 may be associated with same AP as the one or more user devices 120, or may be associated with a different AP of the one or more APs 102. The user device 150 and a user device of the one or more user devices 120 may establish a P2P connection with one another, whether the user device 150 is in the same BSS as the user device of the one or more user devices 120 or not. The user device 150 and the user device of the one or more user devices 120 may exchange one or more P2P frames 152.

In some demonstrative embodiments, the one or more APs 102 may exchange the one or more frames 142 with the one or more user devices to establish whether the one or more user devices 120 have a triggered direct capability, and to agree on parameters for triggered direct P2P communications. For example, the one or more frames 142 may include a capability element 170 indicating a triggered direct P2P capability. The one or more APs 102 may request, using the one or more frames 142, that the one or more user devices 120 indicate whether they have a triggered direct P2P capability. The one or more user devices 120 may respond, using the one or more frames 142, to indicate whether they have a triggered direct P2P capability. The indications of a triggered direct capability may be made with one or more bits (e.g., using the capability element 172, which may be an HE capability element or another element). A 1 bit may indicate that the sending device supports triggered direct P2P communications, and a 0 bit may indicate no such support. The one or more frames 142 may use an existing IEEE 802.11 frame format, or may use a new format. The one or more frames 142 may be sent before association, during association, or after association, and may include parameters used to negotiate the terms of the triggered direct P2P communications during a TXOP of the one or more APs 102 as explained further below.

In some demonstrative embodiments, the one or more frames may be new frames, such as triggered direct action request and response frames. Either the one or more APs 102 or the one or more user devices 120 may send a triggered direct action request frame, and the receiving device may send a triggered direct action response frame in return. The one or more APs 102 may use a triggered direct action frame to indicate that the one or more APs 102 intend to trigger P2P traffic between the one or more user devices 120 and the user device 150. A portion of the frame format for the triggered direct action frames is shown below in Table 1.

TABLE 1

Triggered Direct Request and Response Frame Action Field Format:

| Order | Information |
| --- | --- |
| 1 | Category |
| 2 | Triggered Direct Action |
| 3 | Triggered Direct Element |
| 4 | Target Wake Time Element (optional) |
| 5 | Multi-Band Element (optional) |

Referring to Table 1, the triggered direct element may include parameters that define the triggered direct operation. The parameters may include a triggered identifier (TID) assigned by an AP to a STA for the STA to indicate buffer reports related to the P2P traffic with a peer STA (e.g., the user device 150), a quality of service (QoS) control or buffer status report (BSR) A-control field, or other fields. The parameters may include an indication of whether the triggered direct mode of operation is periodic or aperiodic. When the mode is periodic, the AP 102 may trigger a triggered direct STA (e.g., using a target wake time element to indicate when the STA is to be awake). When aperiodic, the AP 102 may trigger the STA in an adaptive way based on buffer reports, or based on triggered direct TXOP duration requests from the STA. The parameters may include an indication of whether the AP 102 will send regular triggers for buffer reports, and with the periodicity parameter, or whether the AP 102 will not send such triggers in a regular manner. Other example parameters may include QoS parameters, such as triggered direct TXOP periodicity, allowed jitter, minimum triggered direct TXOP duration, requested time per TXOP, current channel load, requested bandwidth, requested P2P transmit power (e.g., due to IEEE 802.11ax spatial reuse), and the like. The parameters may be defined in an element of the one or more frames 142, such as TSPEC element or a new element (e.g., the triggered direct element). The one or more frames 142 may include access identifiers (AIDs) of STAs or medium access control (MAC) addresses of a peer STA (e.g., the user device 150).

In some demonstrative embodiments, the AP 102 and the one or more user devices 120 may exchange the one or more frames 142 until the triggered direct parameters are agreed upon. The device sending a triggered direct request may be an initiator, and the responding device may be the responder. The initiator may propose triggered direct parameters by including any of the parameters in the request. When the responder responds with different parameters, the status of each device may be a "reject" status, and the exchange of the one or more frames 142 may continue. Either device may propose different parameters until the responding device responds with a confirmation of the same parameters, then the devices may reach an agreement based on a "success" status. Either device may request that a triggered direct P2P operation be moved to another channel and/or be managed by another AP.

In some demonstrative embodiments, the triggered direct action frames may include a target wake time element. When present, the target wake time element may establish a target wake time agreement between the AP 102 and the one or more user devices 120, and may establish a periodic target wake time service period during which the AP 102 may trigger the one or more user devices 120 using a triggered direct trigger frame, using a reverse direction grant in response to the one or more user devices 120 requesting a triggered direct P2P operation. The AP 102 and the one or more user devices 120 may define the duration of a target wake time service period and the interval between respective service periods using the target wake time element. The triggered direct action frames may include a multi-band element to provide parameters for a triggered direct operation on a different channel or band than the channel or band being used.

It is understood that the above descriptions are for purposes of illustration and are not meant to be limiting.

Figure 2:
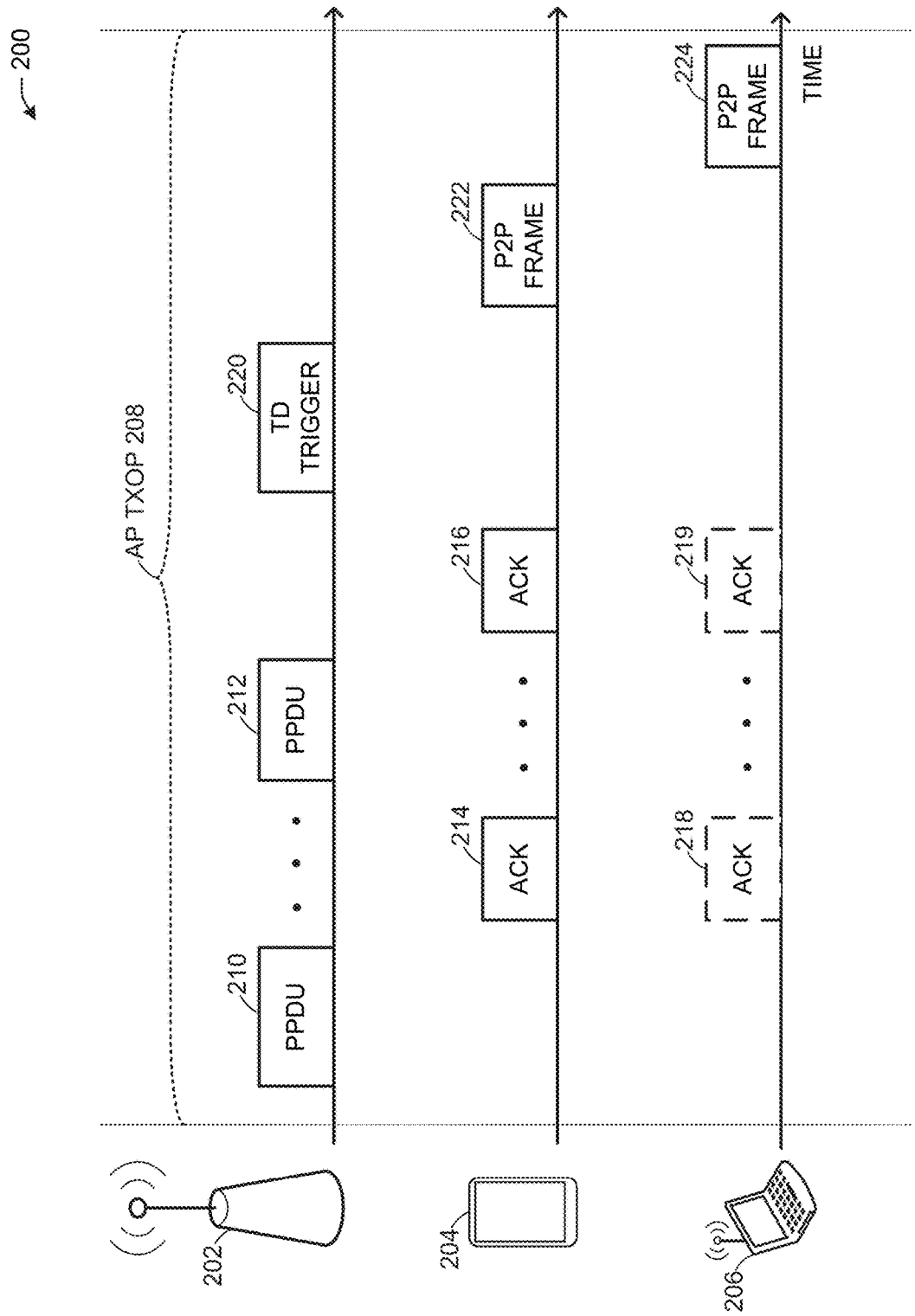
FIG. 2 illustrates a sequence for using an enhanced negotiation protocol for triggered P2P communications, in accordance with one or more example embodiments of the present disclosure.

FIG. 2 illustrates a sequence 200 for using an enhanced negotiation protocol for triggered P2P communications, in accordance with one or more example embodiments of the present disclosure.

Referring to FIG. 2, an AP 202 may communicate with one or more user devices, such as user device 204 and/or user device 206. For example, at least one of the user device 204 or the user device 206 may be associated with the AP 202. During a TXOP 208 of the AP 202, the AP 202 may send one or more DL physical layer (PHY) protocol data units (PPDUs), such as PPDU 210 and PPDU 212, to any associated devices (e.g., in a BSS), such as the user device 204 and/or the user device 206. The associated STAs which receive the DL PPDUs from the AP 202 may respond with an acknowledgment or some other frame (e.g., ACK 214, ACK 216, ACK 218, ACK 219).

Still referring to FIG. 2, after the AP 202 has completed DL transmissions (or before all DL transmissions are complete), the AP 202 may trigger P2P communications between the user device 204 and the user device 206 during the TXOP 208 of the AP 202. In this manner, the devices do not need to contend for the same channel, but rather the AP 202 may allocate a portion of the TXOP 208 to the STAs for P2P communications. The AP 202 may send a triggered direct trigger frame 220 or another type of trigger frame indicating that the STAs may perform P2P communications during the TXOP 208 according to agreed upon parameters. The user device 204 and the user device 206 may exchange P2P frames with one another, such as P2P frame 222 and P2P frame 224, during the TXOP 208. The P2P communications may use the same channel or another channel. In this manner, the user device 204 and the user device 206 may exchange P2P communications without risk of missing any DL transmissions sent by the AP 202, without having to contend for the channel, and with reduced risk of interference.

As explained further below with respect to FIG. 3A and FIG. 3B, the AP 202 and at least one of the user device 204 or the user device 206 may negotiate and agree to use the triggered direct trigger 220 to trigger P2P communications during the TXOP 208 of the AP 202 before the AP sends the triggered direct trigger 220. For the AP 202 to facilitate the triggered direct P2P communications, the AP 202 may need to be aware of the P2P capabilities, relationships, and/or traffic of the user device 204 and the user device 206, and the AP 202 may need to "win" access to the channel using EDCA or another process in order to establish the TXOP 208 for transmissions by the AP 202 (e.g., so that the user device 204 and the user device 206 do not transmit in the channel during the TXOP 208 and may receive transmissions from the AP 202).

It is understood that the above descriptions are for purposes of illustration and are not meant to be limiting.

Figure 3A:
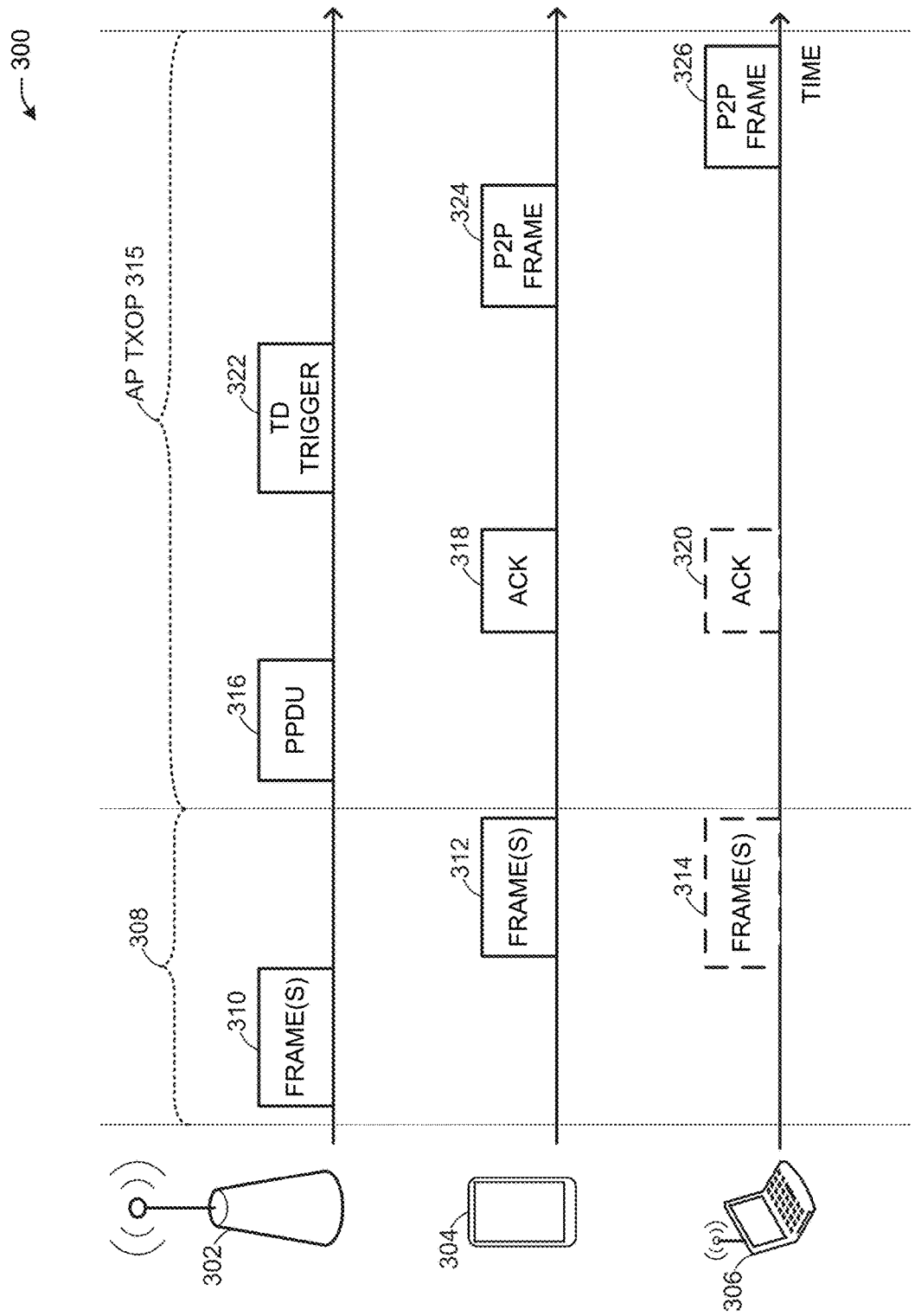
FIG. 3A illustrates a sequence for using an enhanced negotiation protocol for triggered P2P communications, in accordance with one or more example embodiments of the present disclosure.

FIG. 3A illustrates a sequence 300 for using an enhanced negotiation protocol for triggered P2P communications, in accordance with one or more example embodiments of the present disclosure.

Referring to FIG. 3A, an AP 302 may communicate with one or more user devices, such as user device 304 and/or user device 306. For example, at least one of the user device 304 or the user device 306 may be associated with the AP 302. During a negotiation 308, the AP 302, the user device 304, and/or the user device 306 may advertise a triggered P2P communication capability. The AP 302 may send one or more frames 310, such as a triggered direct request action frame or another type of frame (e.g., beacons, probe responses, association responses, etc.), which may include an indication that the AP 302 may operate in a triggered direct mode, and which may include triggered direct P2P parameters (e.g., according to Table 1 above). The user device 304 and or the user device 306 may respond by sending one or more frames 312 and/or one or more frames 314, respectively, which may include triggered direct action response frame indicating whether the user device 304 and/or the user device 306 has a triggered direct P2P capability and the parameters.

Still referring to FIG. 3A, during a TXOP 315 of the AP 302, the AP 302 may send one or more DL physical layer (PHY) protocol data units (PPDUs), such as PPDU 316, to any associated devices (e.g., in a BSS), such as the user device 304 and/or the user device 306. The associated STAs which receive the DL PPDUs from the AP 302 may respond with an acknowledgment or some other frame (e.g., ACK 318, ACK 320). The AP 302 may allocate a portion of the TXOP 315 to P2P communications between the user device 304 and the user device 306. The AP 302 may send a triggered direct trigger 322 to indicate that the TXOP 315 is available for P2P communications according to the agreed upon parameters. The user device 304 and the user device 306 may exchange P2P frames, such as P2P frame 324 and P2P frame 326, during the TXOP 315, without having to contend for the channel and without risk of the AP 302 sending any information during that time.

The AP 302, the user device 304 and/or the user device 306 may exchange multiple rounds of frames until the triggered direct parameters have been agree upon as explained above with respect to FIG. 2. The one or more frames 310 may include an unassociated AID (UAID) of an unassociated STA (e.g., when the user device 306 is not associated with the AP 302). The one or more frames 312 and the one or more frames 314 may include negotiation frames between the user device 304 and the user device 306 to establish which STA will negotiate triggered direct parameters with the AP 302 (e.g., when both STAs are associated with the same AP). When the user device 304 and the user device 306 are in a same channel and only one of them is associated with the AP 302 supporting a triggered direct TXOP, the associated STA may negotiate the triggered direct parameters with the AP 302.

When the user device 304 and the user device 306 are in a same channel and each are associated with different APs supporting triggered direct TXOPs, the one or more frames 312 and the one or more frames 314 may be used to determine which STA will be the triggered direct STA for the AP 302 and which will be the peer STA. For example, the one or more frames 312 and the one or more frames 314 may include information about their respective serving BSS, such as a BSS load or other parameters. The BSS with the lowest load may be selected for the triggered direct P2P communications.

When the user device 304 and the user device 306 are not in a same channel and each are associated with different APs supporting triggered direct TXOPs (e.g., the user device 304 and the user device 306 discover each other using neighbor awareness networking or another protocol), the one or more frames 312 and the one or more frames 314 may be used to determine which STA will be the triggered direct STA for the AP 302 and which will be the peer STA. For example, the one or more frames 312 and the one or more frames 314 may include information about their respective serving BSS, such as a BSS load or other parameters. The BSS with the lowest load may be selected for the triggered direct P2P communications. The peer STA may have to change between one channel when operating with its associated AP and when operating in a P2P link with the triggered direct P2P STA (e.g., the user device 306 may use one channel for P2P communications, and another channel for communications with another AP). The one or more frames 312 and the one or more frames 314 may be used to negotiate requirements for time slicing between the two channels. The user device 304 and the user device 306 may need to agree on an amount of time needed for P2P traffic (e.g., negotiate using the one or more frames 312 and the one or more frames 314), and may need to collect requirements from each other regarding operations with their respective APs, P2P applications, the amount of time and when during a beacon interval (e.g., an interval between respective beacons sent by an AP) they are available for triggered direct communications during the TXOP 315, and when they need to be connected to their respective APs. The negotiating STA (e.g., the triggered direct STA) for a respective AP may include such information in the parameter negotiation with a respective AP.

When a STA becomes a triggered direct STA (e.g., the user device 304 becomes a triggered direct STA with the AP 302) after successful negotiation with the AP 302, the triggered direct STA may inform its peer STA (e.g., the user device 306) that the triggered direct STA will operate in a triggered direct TXOP mode (e.g., using the one or more frames 312 and the one or more frames 314 as a triggered direct request and response exchange), and may define the behavior of the peer STA as agreed with the AP 302 (e.g., the behavior may specify that the user device 306 may not access the channel used by the AP 302 and the user device 304 for P2P traffic—only the triggered direct STA may access the channel for the P2P traffic).

Figure 3B:
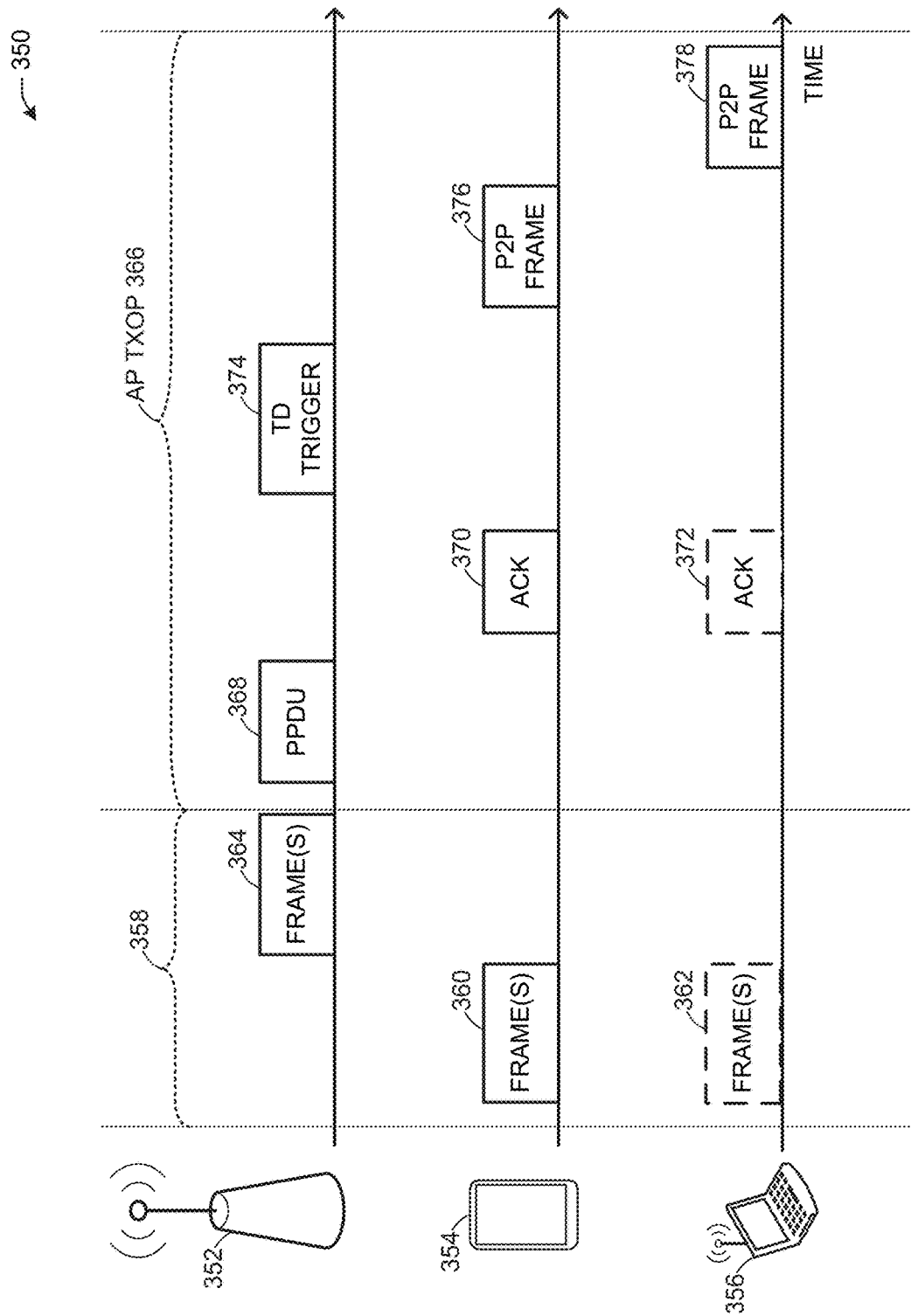
FIG. 3B illustrates a sequence for using an enhanced negotiation protocol for triggered P2P communications, in accordance with one or more example embodiments of the present disclosure.

FIG. 3B illustrates a sequence 350 for using an enhanced negotiation protocol for triggered P2P communications, in accordance with one or more example embodiments of the present disclosure.

Referring to FIG. 3B, an AP 352 may communicate with one or more user devices, such as user device 354 and/or user device 356. For example, at least one of the user device 354 or the user device 356 may be associated with the AP 352. During a negotiation 358, the AP 352, the user device 354, and/or the user device 356 may advertise a triggered P2P communication capability. The user device 354 may send one or more frames 360 and/or the user device 356 may send one or more frames 362, such as a triggered direct request action frame or another type of frame (e.g., probe requests, association requests, etc.), which may include an indication that the user device 354 and/or the user device 356 may operate in a triggered direct mode, and which may include triggered direct P2P parameters (e.g., according to Table 1 above). The AP 302 may respond by sending one or more frames 364, which may include triggered direct action response frame indicating whether the AP 352 has a triggered direct P2P capability and the parameters.

Still referring to FIG. 3A, during a TXOP 366 of the AP 352, the AP 352 may send one or more DL PPDUs, such as PPDU 368, to any associated devices (e.g., in a BSS), such as the user device 354 and/or the user device 356. The associated STAs which receive the DL PPDUs from the AP 352 may respond with an acknowledgment or some other frame (e.g., ACK 370, ACK 372). The AP 352 may allocate a portion of the TXOP 366 to P2P communications between the user device 354 and the user device 356. The AP 352 may send a triggered direct trigger 374 to indicate that the TXOP 366 is available for P2P communications according to the agreed upon parameters. The user device 354 and the user device 356 may exchange P2P frames, such as P2P frame 376 and P2P frame 378, during the TXOP 366, without having to contend for the channel and without risk of the AP 352 sending any information during that time.

The AP 352, the user device 354 and/or the user device 356 may exchange multiple rounds of frames until the triggered direct parameters have been agree upon as explained above with respect to FIG. 2. The one or more frames 364 may include an unassociated AID (UAID) of an unassociated STA (e.g., when the user device 356 is not associated with the AP 352). The one or more frames 360 and the one or more frames 362 may include negotiation frames between the user device 354 and the user device 356 to establish which STA will negotiate triggered direct parameters with the AP 352 (e.g., when both STAs are associated with the same AP). When the user device 354 and the user device 356 are in a same channel and only one of them is associated with the AP 352 supporting a triggered direct TXOP, the associated STA may negotiate the triggered direct parameters with the AP 352.

When the user device 354 and the user device 356 are in a same channel and each are associated with different APs supporting triggered direct TXOPs, the one or more frames 360 and the one or more frames 362 may be used to determine which STA will be the triggered direct STA for the AP 352 and which will be the peer STA. For example, the one or more frames 360 and the one or more frames 362 may include information about their respective serving BSS, such as a BSS load or other parameters. The BSS with the lowest load may be selected for the triggered direct P2P communications.

When the user device 354 and the user device 356 are not in a same channel and each are associated with different APs supporting triggered direct TXOPs (e.g., the user device 354 and the user device 356 discover each other using neighbor awareness networking or another protocol), the one or more frames 360 and the one or more frames 362 may be used to determine which STA will be the triggered direct STA for the AP 352 and which will be the peer STA. For example, the one or more frames 360 and the one or more frames 362 may include information about their respective serving BSS, such as a BSS load or other parameters. The BSS with the lowest load may be selected for the triggered direct P2P communications. The peer STA may have to change between one channel when operating with its associated AP and when operating in a P2P link with the triggered direct P2P STA (e.g., the user device 356 may use one channel for P2P communications, and another channel for communications with another AP). The one or more frames 360 and the one or more frames 362 may be used to negotiate requirements for time slicing between the two channels. The user device 354 and the user device 356 may need to agree on an amount of time needed for P2P traffic (e.g., negotiate using the one or more frames 360 and the one or more frames 360), and may need to collect requirements from each other regarding operations with their respective APs, P2P applications, the amount of time and when during a beacon interval (e.g., an interval between respective beacons sent by an AP) they are available for triggered direct communications during the TXOP 366, and when they need to be connected to their respective APs. The negotiating STA (e.g., the triggered direct STA) for a respective AP may include such information in the parameter negotiation with a respective AP.

When a STA becomes a triggered direct STA (e.g., the user device 354 becomes a triggered direct STA with the AP 352) after successful negotiation with the AP 352, the triggered direct STA may inform its peer STA (e.g., the user device 356) that the triggered direct STA will operate in a triggered direct TXOP mode (e.g., using the one or more frames 360 and the one or more frames 362 as a triggered direct request and response exchange), and may define the behavior of the peer STA as agreed with the AP 352 (e.g., the behavior may specify that the user device 356 may not access the channel used by the AP 352 and the user device 354 for P2P traffic—only the triggered direct STA may access the channel for the P2P traffic).

Figure 4A:
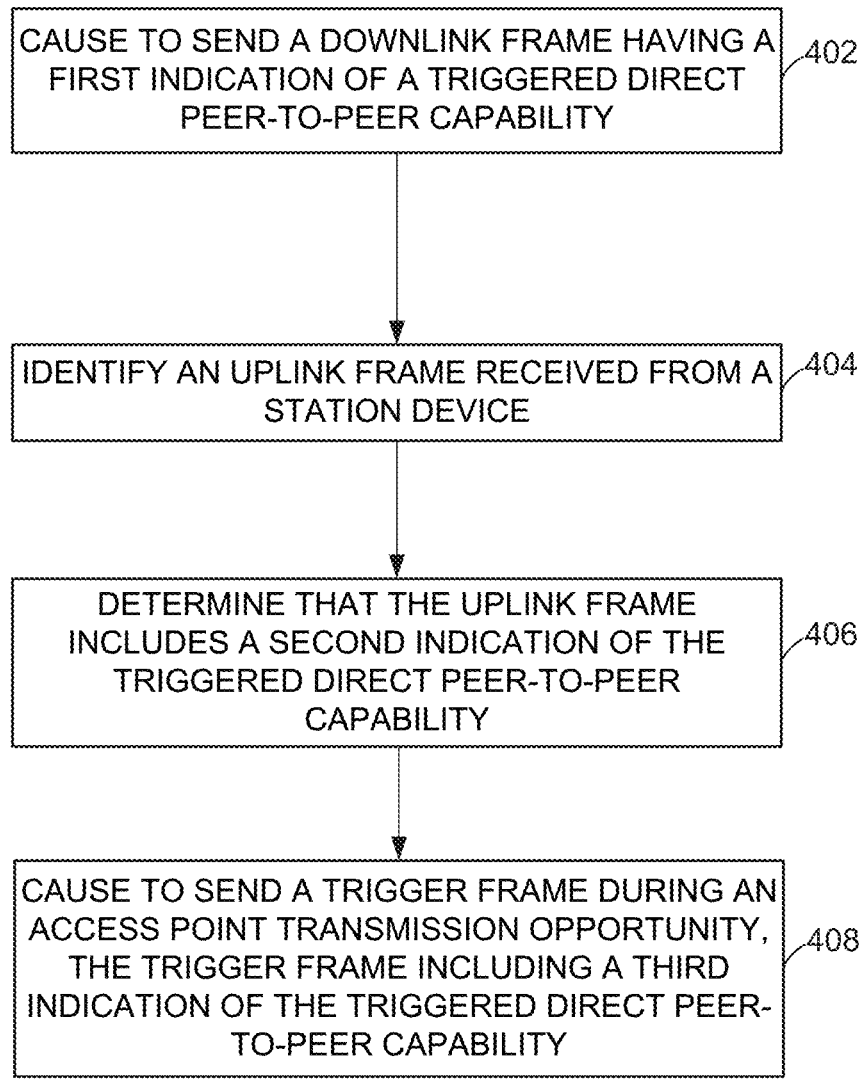
FIG. 4A depicts a flow diagram of an illustrative process for using an enhanced negotiation protocol for triggered P2P communications, in accordance with one or more example embodiments of the present disclosure.

FIG. 4A depicts a flow diagram of an illustrative process 400 for using an enhanced negotiation protocol for triggered P2P communications, in accordance with one or more example embodiments of the present disclosure.

At block 402, processing circuitry of a device (e.g., the AP 102 of FIG. 1, the AP 302 of FIG. 3A, the AP 352 of FIG. 3B)) may cause the device send a downlink (DL) frame (e.g., the one or more frames 310 of FIG. 3A, the one or more frames 364 of FIG. 3B) including an indication of a triggered direct P2P capability (e.g., using an HE capability element, a triggered direct element, or another element), and including parameters for a triggered direct P2P operation.

At block 404, the processing circuitry of the device may identify a UL frame (e.g., the one or more frames 312 of FIG. 3A, the one or more frames 314 of FIG. 3A, the one or more frames 360 of FIG. 3B, the one or more frames 362 of FIG. 3B) received from a station device (e.g., the one or more user devices 120 of FIG. 1, the user device 150 of FIG. 1, the user device 304 of FIG. 3A, the user device 306 of FIG. 3A, the user device 354 of FIG. 3B, the user device 356 of FIG. 3B). The device and the STA (or multiple STAs) may exchange multiple uplink and downlink frames to indicate that the devices may perform triggered direct P2P communications during a TXOP of the device (e.g., the TXOP 208 of FIG. 2, the TXOP 315 of FIG. 3, the TXOP 366 of FIG. 3B), and the frames may provide parameters used to govern the triggered direct operation until the devices agree on the parameters.

At block 406, the processing circuitry of the device may determine that the UL frame includes an indication that the STA supports the triggered direct P2P communication. For example, the DL and UL frames may include the same element or bit indicating the capability.

At block 408, the processing circuitry of the device may cause the device to send a triggered direct trigger frame or other trigger frame during the TXOP of the device. The triggered direct trigger frame may include an indication of the agreed upon triggered direct P2P communication and the parameters.

Figure 4B:
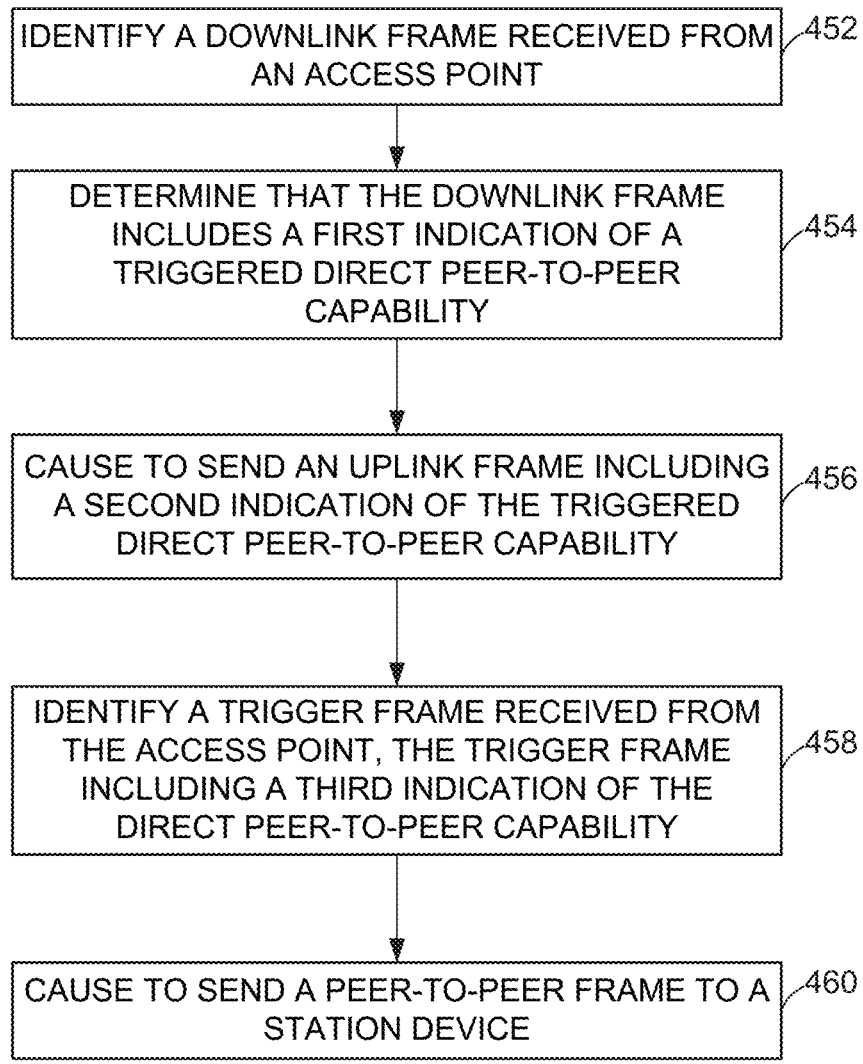
FIG. 4B depicts a flow diagram of an illustrative process for using an enhanced negotiation protocol for triggered P2P communications, in accordance with one or more example embodiments of the present disclosure.

FIG. 4B depicts a flow diagram of an illustrative process 450 for using an enhanced negotiation protocol for triggered P2P communications, in accordance with one or more example embodiments of the present disclosure.

At block 452, processing circuitry of a device (e.g., the one or more user devices 120 of FIG. 1, the user device 150 of FIG. 1, the user device 304 of FIG. 3A, the user device 306 of FIG. 3A, the user device 354 of FIG. 3B, the user device 356 of FIG. 3B) may identify a DL frame (e.g., the one or more frames 310 of FIG. 3A, the one or more frames 364 of FIG. 3B) received from an AP (e.g., the AP 102 of FIG. 1, the AP 302 of FIG. 3A, the AP 352 of FIG. 3B). The DL frame may include an indication of a triggered direct P2P capability (e.g., using an HE capability element, a triggered direct element, or another element), and including parameters for a triggered direct P2P operation.

At block 454, the processing circuitry of the device may determine that the DL frame includes a first indication of the triggered direct P2P capability (e.g., using an HE capability element, a triggered direct element, or another element), and includes parameters for a triggered direct P2P operation. The device and the AP may exchange frames until triggered direct parameters are agreed upon. The device may negotiate with another STA (e.g., a STA in a P2P connection with the device) to establish which device is the triggered direct STA of the AP.

At block 456, the processing circuitry of the device may cause the device to send a UL frame including a second indication of the triggered direct P2P capability. The indication may use the same element or bit as the indication provided by the AP. The device may initiate the request-response exchange with the AP, or the AP may be the initiator. The request-response exchange may include multiple exchanges and may include a negotiation of triggered direct parameters.

At block 458, the processing circuitry of the device may identify a triggered direct trigger frame or another frame used to trigger the P2P communications between the device and a peer STA during a TXOP of the AP (e.g., the TXOP 208 of FIG. 2, the TXOP 315 of FIG. 3, the TXOP 366 of FIG. 3B).

At block 460, the device may cause to send and/or receive one or more P2P frames (e.g., the P2P frame 324 of FIG. 3A, the P2P frame 326 of FIG. 3A, the P2P frame 376 of FIG. 3B, the P2P frame 378 of FIG. 3B) during the TXOP of the AP. The device may notify the AP that the P2P communications are complete.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1-4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an enhanced triggered direct device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced triggered direct device 619 may carry out or perform any of the operations and processes (e.g., process 400 of FIG. 4A, process 450 of FIG. 4B) described and shown above.

It is understood that the above are only a subset of what the enhanced triggered direct device 619 may be configured to perform and that other functions included throughout this disclosure may also be performed by the enhanced triggered direct device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be a device comprising memory and processing circuitry configured to: cause to send a downlink frame comprising a first indication of a triggered direct peer-to-peer capability; identify an uplink frame received from a station device; determine that the uplink frame comprises a second indication of the triggered direct peer-to-peer capability; and cause to send a trigger frame during a transmission opportunity associated with the device, wherein the trigger frame comprises a third indication of the triggered direct peer-to-peer capability.

Example 2 may include the device of example 1 and/or some other example herein, wherein the processing circuitry is further configured to identify a request frame received from the station device, wherein the request frame comprises a fourth indication of the triggered direct peer-to-peer capability, and wherein to cause send the downlink frame is based on the request frame.

Example 3 may include the device of example 1 and/or some other example herein, wherein the downlink frame comprises a high efficiency capability element, and wherein the high efficiency capability element comprises the first indication.

Example 4 may include the device of example 1 and/or some other example herein, wherein the downlink frame is a triggered direct request frame comprising a triggered direct element, and wherein the triggered direct element comprises the first indication.

Example 5 may include the device of example 1 and/or some other example herein, wherein the downlink frame is a triggered direct request frame comprising a triggered direct element, and wherein the triggered direct element comprises at least one of a triggered identifier associated with the station device, an indication of a periodic mode associated with the triggered direct peer-to-peer capability, an indication of an aperiodic mode associated with the triggered direct peer-to-peer capability, an indication of buffer reports, or an indication of quality of service parameters.

Example 6 may include the device of example 1 and/or some other example herein, wherein the downlink frame is a triggered direct request frame comprising a triggered direct element, and wherein the triggered direct element comprises a target wake time element.

Example 7 may include the device of example 1 and/or some other example herein, wherein the downlink frame is a triggered direct request frame comprising a triggered direct element, and wherein the triggered direct element comprises a multi-band element.

Example 8 may include the device of example 1 and/or some other example herein, wherein the processing circuitry is further configured to identify a request frame received from the station device, and wherein the downlink frame is a triggered direct response frame comprising a triggered direct element, and wherein the triggered direct element comprises at least one of a triggered identifier associated with the station device, an indication of a periodic mode associated with the triggered direct peer-to-peer capability, an indication of an aperiodic mode associated with the triggered direct peer-to-peer capability, an indication of buffer reports, or an indication of quality of service parameters.

Example 9 may include the device of example 1 and/or some other example herein, wherein the processing circuitry is further configured to identify peer-to-peer communications associated with the station device using a channel, and wherein the downlink frame is based on the identification of the peer-to-peer communications.

Example 10 may include the device of example 1 and/or some other example herein, further comprising a transceiver configured to transmit and receive wireless signals, wherein the wireless signals comprise at least one of the downlink frame, the uplink frame, or the trigger frame.

Example 11 may include the device of example 10 and/or some other example herein, further comprising one or more antennas coupled to the transceiver.

Example 12 may include a non-transitory computer-readable medium storing computer-executable instructions which when executed by one or more processors result in performing operations comprising: identifying, by a first station device, a downlink frame received from an access point; determining that the downlink frame comprises a first indication of a triggered direct peer-to-peer capability; causing to send an uplink frame, wherein the uplink frame comprises a second indication of the triggered direct peer-to-peer capability; identifying a trigger frame received from the access point, wherein the trigger frame comprises a third indication of the triggered direct peer-to-peer capability; and causing to send a peer-to-peer frame to a second station device.

Example 13 may include the non-transitory computer-readable medium of example 12 and/or some other example herein, the operations further comprising determining that the first station device is a triggered direct station device associated with the triggered direct peer-to-peer capability.

Example 14 may include the non-transitory computer-readable medium of example 12 and/or some other example herein, the operations further comprising determining that the second station device is a triggered direct station device associated with the triggered direct peer-to-peer capability.

Example 15 may include the non-transitory computer-readable medium of example 12 and/or some other example herein, the operations further comprising causing to send a request frame to the access point, wherein the request frame comprises a fourth indication of the triggered direct peer-to-peer capability.

Example 16 may include the non-transitory computer-readable medium of example 12 and/or some other example herein, wherein the downlink frame comprises a high efficiency capability element, and wherein the high efficiency capability element comprises the first indication.

Example 17 may include the non-transitory computer-readable medium of example 12 and/or some other example herein, wherein the downlink frame is a triggered direct request frame comprising a triggered direct element, and wherein the triggered direct element comprises the first indication.

Example 18 may include the non-transitory computer-readable medium of example 12 and/or some other example herein, wherein the downlink frame is a triggered direct request frame comprising a triggered direct element, and wherein the triggered direct element comprises at least one of a triggered identifier associated with the first station device, an indication of a periodic mode associated with the triggered direct peer-to-peer capability, an indication of an aperiodic mode associated with the triggered direct peer-to-peer capability, an indication of buffer reports, or an indication of quality of service parameters.

Example 19 may include the non-transitory computer-readable medium of example 12 and/or some other example herein, wherein the downlink frame is a triggered direct request frame comprising a triggered direct element, and wherein the triggered direct element comprises at least one of a target wake time element or a multi-band element.

Example 20 may include a method comprising: causing, by processing circuitry of an access point, to send a downlink frame comprising a first indication of a triggered direct peer-to-peer capability; identifying, by the processing circuitry, an uplink frame received from a station device; determining, by the processing circuitry, that the uplink frame comprises a second indication of the triggered direct peer-to-peer capability; and causing to send, by the processing circuitry, a trigger frame during a transmission opportunity associated with the access point, wherein the trigger frame comprises a third indication of the triggered direct peer-to-peer capability.

Example 21 may include an apparatus comprising means for: causing to send a downlink frame from an AP, the downlink frame comprising a first indication of a triggered direct peer-to-peer capability; identifying an uplink frame received from a station device; determining that the uplink frame comprises a second indication of the triggered direct peer-to-peer capability; and causing to send a trigger frame during a transmission opportunity associated with the AP, wherein the trigger frame comprises a third indication of the triggered direct peer-to-peer capability.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 7:
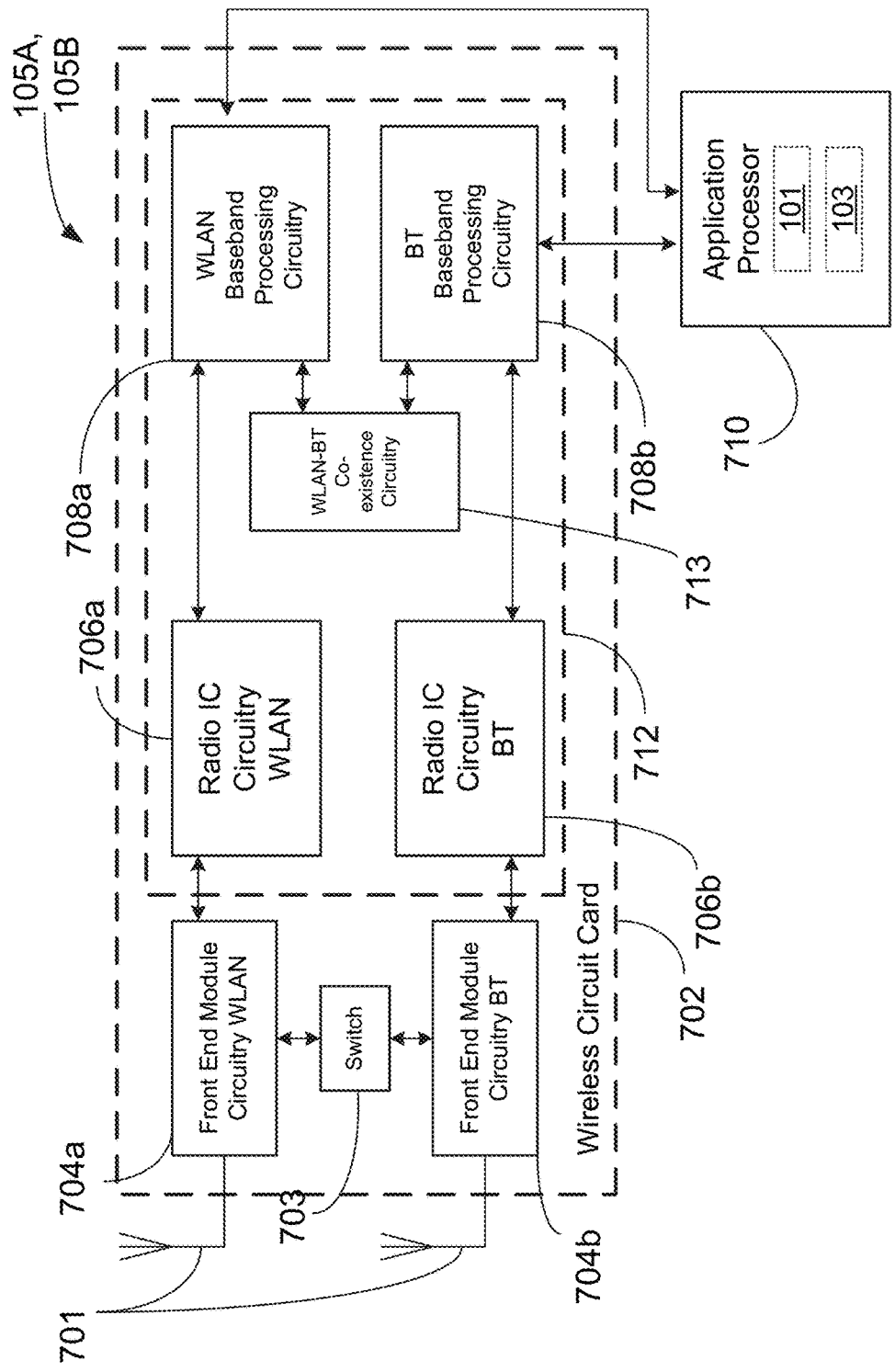
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example user device(s) 120 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
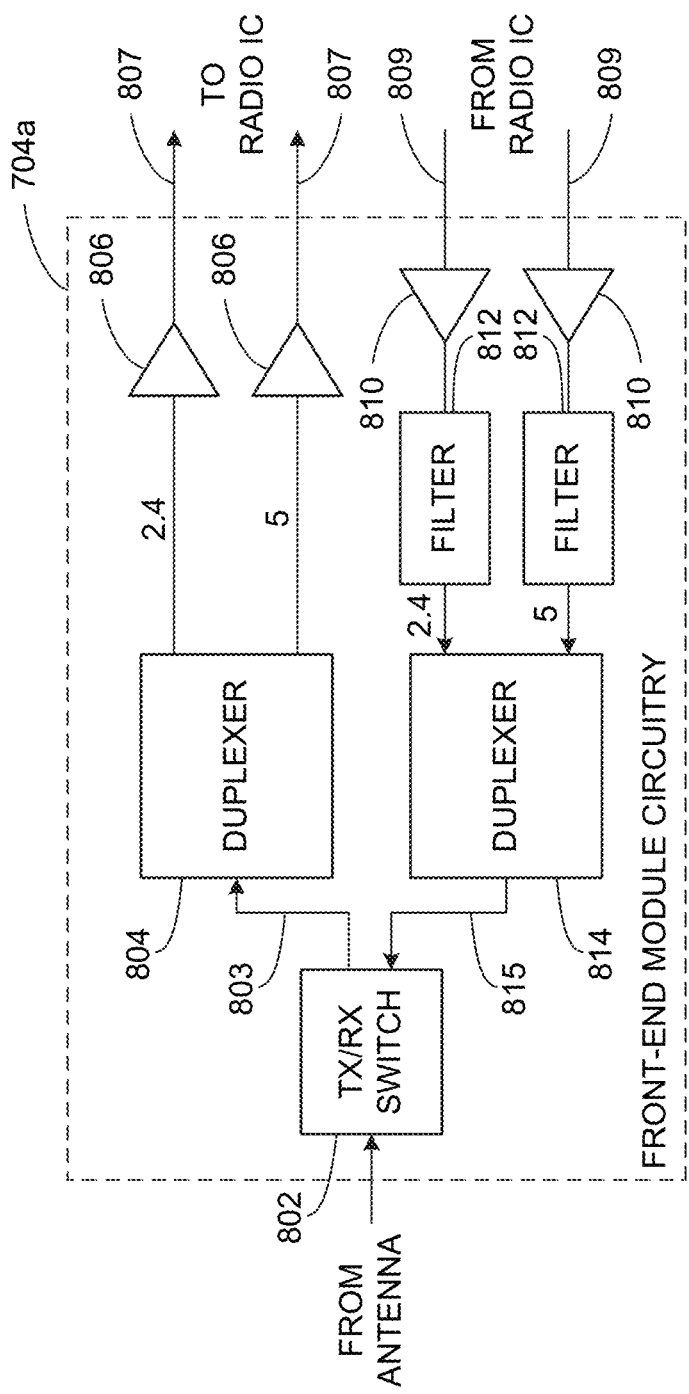
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
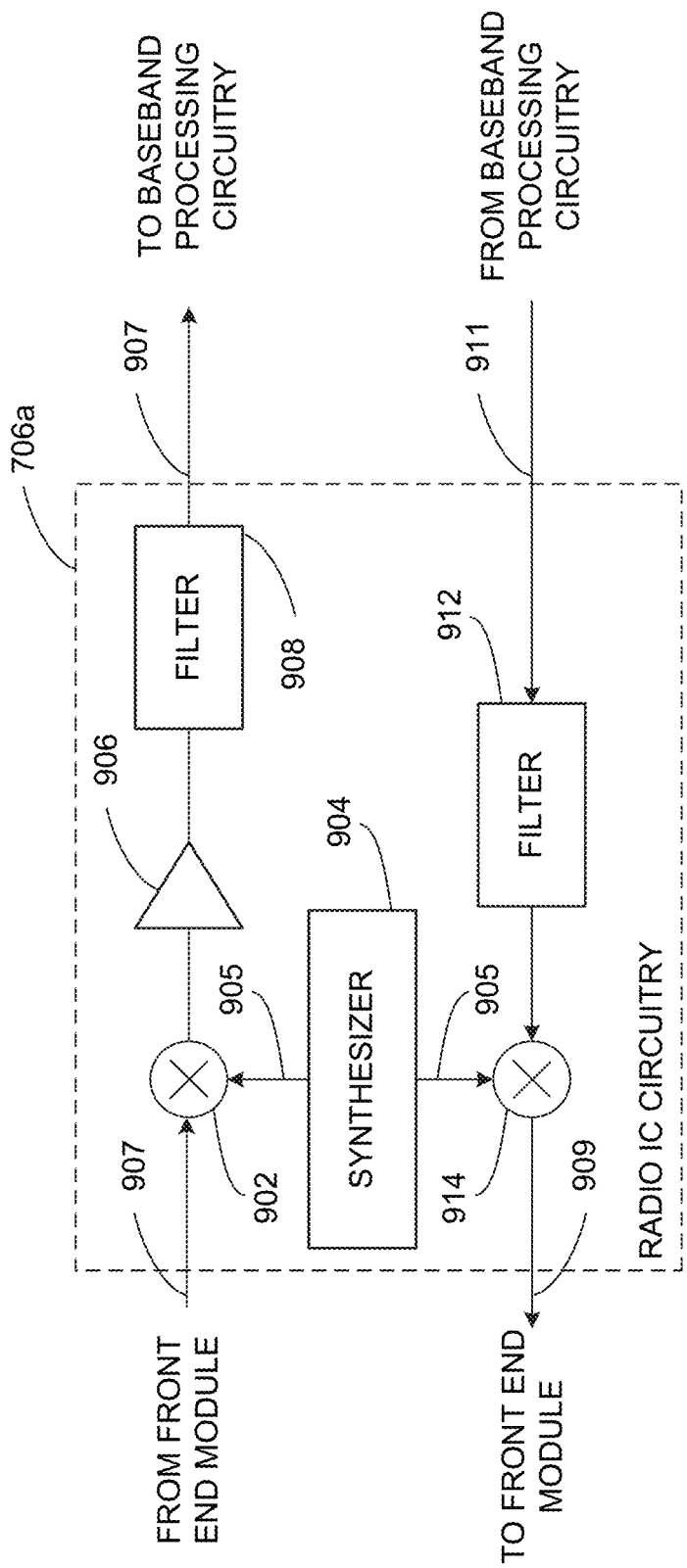
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
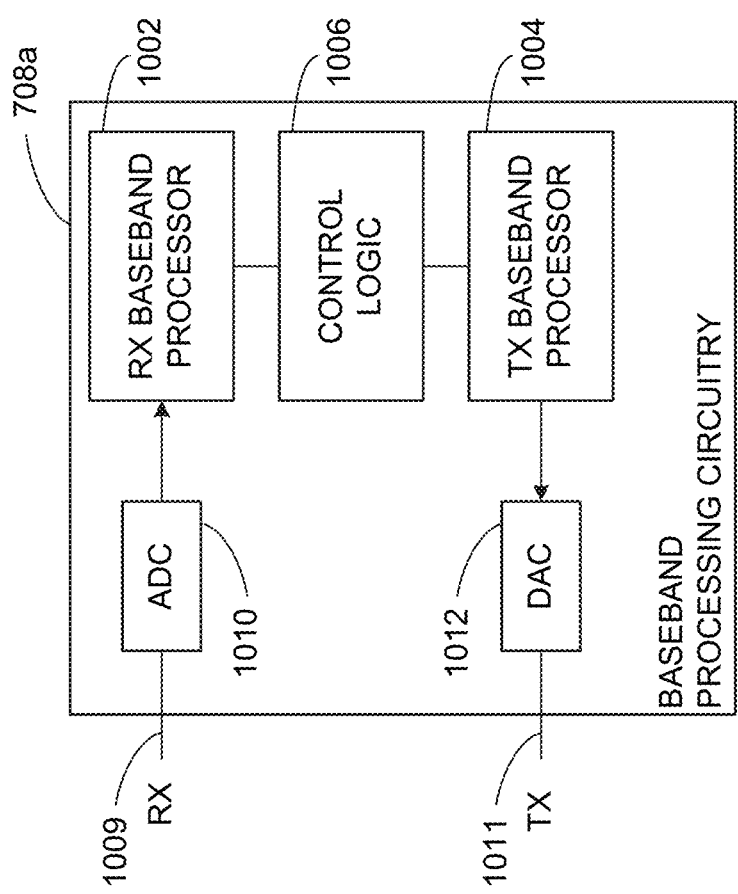
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. A device, the device comprising processing circuitry coupled to storage, the processing circuitry configured to:
    cause to send a downlink frame comprising a first indication of a triggered direct peer-to-peer capability;
    identify an uplink frame received from a station device, wherein the uplink frame is received during a transmit opportunity (TXOP) originally assigned to the device;
    determine that the uplink frame comprises a second indication of the triggered direct peer-to-peer capability; and
    cause to send a trigger frame during a transmission opportunity associated with the device, wherein the trigger frame comprises a third indication of the triggered direct peer-to-peer capability.

2. The device of claim 1, wherein the processing circuitry is further configured to identify a request frame received from the station device, wherein the request frame comprises a fourth indication of the triggered direct peer-to-peer capability, and wherein to cause send the downlink frame is based on the request frame.

3. The device of claim 1, wherein the downlink frame comprises a high efficiency capability element, and wherein the high efficiency capability element comprises the first indication.

4. The device of claim 1, wherein the downlink frame is a triggered direct request frame comprising a triggered direct element, and wherein the triggered direct element comprises the first indication.

5. The device of claim 1, wherein the downlink frame is a triggered direct request frame comprising a triggered direct element, and wherein the triggered direct element comprises at least one of a triggered identifier associated with the station device, an indication of a periodic mode associated with the triggered direct peer-to-peer capability, an indication of an aperiodic mode associated with the triggered direct peer-to-peer capability, an indication of buffer reports, or an indication of quality of service parameters.

6. The device of claim 1, wherein the downlink frame is a triggered direct request frame comprising a triggered direct element, and wherein the triggered direct element comprises a target wake time element.

7. The device of claim 1, wherein the downlink frame is a triggered direct request frame comprising a triggered direct element, and wherein the triggered direct element comprises a multi-band element.

8. The device of claim 1, wherein the processing circuitry is further configured to identify a request frame received from the station device, and wherein the downlink frame is a triggered direct response frame comprising a triggered direct element, and wherein the triggered direct element comprises at least one of a triggered identifier associated with the station device, an indication of a periodic mode associated with the triggered direct peer-to-peer capability, an indication of an aperiodic mode associated with the triggered direct peer-to-peer capability, an indication of buffer reports, or an indication of quality of service parameters.

9. The device of claim 1, wherein the processing circuitry is further configured to identify peer-to-peer communications associated with the station device using a channel, and wherein the downlink frame is based on the identification of the peer-to-peer communications.

10. The device of claim 1, further comprising a transceiver configured to transmit and receive wireless signals, wherein the wireless signals comprise at least one of the downlink frame, the uplink frame, or the trigger frame.

11. The device of claim 10, further comprising an antenna coupled to the transceiver.

12. A non-transitory computer-readable medium storing computer-executable instructions which when executed by one or more processors result in performing operations comprising:
   identifying, by a first station device, a downlink frame received from an access point;
   determining that the downlink frame comprises a first indication of a triggered direct peer-to-peer capability;
   causing to send an uplink frame, wherein the uplink frame comprises a second indication of the triggered direct peer-to-peer capability, wherein the uplink frame is sent during a transmit opportunity (TXOP) originally assigned to the access point;
   identifying a trigger frame received from the access point, wherein the trigger frame comprises a third indication of the triggered direct peer-to-peer capability; and
   causing to send a peer-to-peer frame to a second station device.

13. The non-transitory computer-readable medium of claim 12, the operations further comprising determining that the first station device is a triggered direct station device associated with the triggered direct peer-to-peer capability.

14. The non-transitory computer-readable medium of claim 12, the operations further comprising determining that the second station device is a triggered direct station device associated with the triggered direct peer-to-peer capability.

15. The non-transitory computer-readable medium of claim 12, the operations further comprising causing to send a request frame to the access point, wherein the request frame comprises a fourth indication of the triggered direct peer-to-peer capability.

16. The non-transitory computer-readable medium of claim 12, wherein the downlink frame comprises a high efficiency capability element, and wherein the high efficiency capability element comprises the first indication.

17. The non-transitory computer-readable medium of claim 12, wherein the downlink frame is a triggered direct request frame comprising a triggered direct element, and wherein the triggered direct element comprises the first indication.

18. The non-transitory computer-readable medium of claim 12, wherein the downlink frame is a triggered direct request frame comprising a triggered direct element, and wherein the triggered direct element comprises at least one of a triggered identifier associated with the first station device, an indication of a periodic mode associated with the triggered direct peer-to-peer capability, an indication of an aperiodic mode associated with the triggered direct peer-to-peer capability, an indication of buffer reports, or an indication of quality of service parameters.

19. The non-transitory computer-readable medium of claim 12, wherein the downlink frame is a triggered direct request frame comprising a triggered direct element, and wherein the triggered direct element comprises at least one of a target wake time element or a multi-band element.

20. A method, comprising:
   causing, by processing circuitry of an access point, to send a downlink frame comprising a first indication of a triggered direct peer-to-peer capability;
   identifying, by the processing circuitry, an uplink frame received from a station device wherein the uplink frame is received during a transmit opportunity (TXOP) originally assigned to the device;
   determining, by the processing circuitry, that the uplink frame comprises a second indication of the triggered direct peer-to-peer capability; and
   causing to send, by the processing circuitry, a trigger frame during a transmission opportunity associated with the access point, wherein the trigger frame comprises a third indication of the triggered direct peer-to-peer capability.

* * * * *